US008520632B2

(12) United States Patent  
Hsu et al.

(10) Patent No.: US 8,520,632 B2  
(45) Date of Patent: Aug. 27, 2013

(54) METHOD AND APPARATUS FOR SYNCHRONIZATION DURING A HANDOVER FAILURE IN A WIRELESS COMMUNICATION SYSTEM

(75) Inventors: Liangchi Hsu, San Diego, CA (US); Aziz Gholmieh, Del Mar, CA (US); Kiran KishanRao Patil, Hyderabad (IN); Guruvayurappan Vasudevan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 611 days.

(21) Appl. No.: 12/643,915

(22) Filed: Dec. 21, 2009

(65) Prior Publication Data

US 2010/0165835 A1 Jul. 1, 2010

Related U.S. Application Data

(60) Provisional application No. 61/141,037, filed on Dec. 29, 2008.

(51) Int. Cl.  
*H04W 4/00* (2009.01)

(52) U.S. Cl.  
USPC .......................................... 370/331; 455/436

(58) Field of Classification Search  
None  
See application file for complete search history.

(56) References Cited

U.S. PATENT DOCUMENTS

| | | | | |
|---|---|---|---|---|
| 6,078,813 | A * | 6/2000 | Ljung | 455/436 |
| 7,212,843 | B2 * | 5/2007 | Boos et al | 455/574 |
| 7,818,006 | B2 * | 10/2010 | Kim et al. | 455/436 |
| 2007/0291729 | A1 * | 12/2007 | Dalsgaard et al. | 370/347 |
| 2008/0039092 | A1 * | 2/2008 | Kitazoe | 455/436 |
| 2008/0090573 | A1 * | 4/2008 | Kim et al. | 455/436 |
| 2008/0214225 | A1 * | 9/2008 | Choukroun et al. | 455/522 |
| 2008/0232310 | A1 | 9/2008 | Xu | |
| 2009/0046641 | A1 * | 2/2009 | Wang et al. | 370/329 |

(Continued)

FOREIGN PATENT DOCUMENTS

| | | |
|---|---|---|
| WO | WO0005909 | 2/2000 |
| WO | WO2007025138 A2 | 3/2007 |

(Continued)

OTHER PUBLICATIONS

Written Opinion—PCT/US2009/069494, International Search Authority, European Patent Office, Apr. 22, 2010.

(Continued)

*Primary Examiner* — Hassan Kizou  
*Assistant Examiner* — Roberta A Shand  
(74) *Attorney, Agent, or Firm* — Rupit M. Patel

(57) ABSTRACT

Systems and methodologies are described herein that facilitate synchronization of Node B-ordered parameters, such as discontinuous transmission (DTX)/discontinuous reception (DRX) status, following a handover failure and/or other suitable triggering events. As described herein, upon failure of a handover from a source Node B to a target Node B, a mobile device can return to the source Node B and synchronize with the source Node B with respect to DTX/DRX status and/or other Node B-ordered parameters. DTX/DRX synchronization can be performed by setting DTX/DRX status to a default state, a last DTX/DRX state utilized prior to initiation of the failed handover, or the like. Identification of the last DTX/DRX state can be conducted as described herein according to an analysis of respective orders communicated by the source Node B in relation to respective time intervals following initiation of the failed handover.

43 Claims, 15 Drawing Sheets

(56) References Cited

U.S. PATENT DOCUMENTS

| | | | |
|---|---|---|---|
| 2009/0149180 A1* | 6/2009 | Kitazoe | 455/436 |
| 2009/0190554 A1* | 7/2009 | Cho | 370/331 |
| 2009/0264132 A1* | 10/2009 | Tajima et al. | 455/436 |

FOREIGN PATENT DOCUMENTS

| | | |
|---|---|---|
| WO | 2008090592 A1 | 7/2008 |
| WO | WO2008094017 A2 | 8/2008 |
| WO | WO2008115446 A1 | 9/2008 |
| WO | WO2008115447 A2 | 9/2008 |

OTHER PUBLICATIONS

International Search Report PCT/US09/069494, International Search Authority European Patent Office Apr. 22, 2010.

3GPP Qualcomm Europe, Ericsson, Nortel, Panasonic, Vodafone, Nokia, CRs(Rel-5 and Rel-6 Category A) to TS 25.214 on Clarification of UE procedure in case of HHO failure, TSG RAN Meeting #24, RP-040257, Jun. 4, 2004.

Taiwan Search Report—TW098145588—TIPO—Jan. 4, 2013.

* cited by examiner

METHOD AND APPARATUS FOR SYNCHRONIZATION DURING A HANDOVER FAILURE IN A WIRELESS COMMUNICATION SYSTEM

CLAIM OF PRIORITY UNDER 35 U.S.C. §119

The present Application for Patent claims priority to U.S. Provisional Application Ser. No. 61/141,037, filed Dec. 29, 2008, entitled "METHOD AND APPARATUS FOR SYNCHRONIZATION DURING HANDOVER FAILURE IN WIRELESS COMMUNICATIONS," assigned to the assignee hereof and hereby expressly incorporated by reference in its entirety.

BACKGROUND

I. Field

The present disclosure relates generally to wireless communications, and more specifically to techniques for facilitating failure recovery and network/device synchronization in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Devices operating in a wireless communication system can operate according to various configuration factors, which can be determined in a global fashion by a radio network controller (RNC) and/or another suitable entity. Additionally, a device operating in a wireless communication system can operate according to parameters ordered or otherwise specified by a serving cell to the device. For example, a device can be configured to utilize continuous packet connectivity (CPC), which can leverage features such as discontinuous transmission (DTX), discontinuous reception (DRX), or the like. In addition, a mobile device can perform a handover or handoff procedure under various circumstances, wherein the mobile device moves from the coverage of a source cell to a target cell. Upon failure of a handover, a mobile device is traditionally instructed to return to the source cell. Thus, upon return to the source cell upon encountering a handover failure, it would be desirable to implement techniques for synchronizing CPC configuration and/or other cell-controlled parameters between a mobile device and a serving cell.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a diversion of communication associated with a handover and one or more Node B-ordered parameters of an associated Node B; reestablishing communication subsequent to the diversion of communication upon detecting a triggering event associated with the handover; and synchronizing with respect to the one or more Node B-ordered parameters of the associated Node B upon re-establishment of communication according to at least one failure recovery resynchronization procedure.

A second aspect described herein relates to a wireless communications apparatus, which can comprise a memory that stores data relating to a handover from a source Node B to a target Node B. The wireless communications apparatus can further comprise a processor configured to synchronize with respect to one or more Node B-ordered configuration parameters of the source Node B upon detecting that the handover has encountered a failure.

A third aspect relates to an apparatus, which can comprise means for initializing a handover from a source cell to a target cell; means for returning to coverage of the source cell upon detecting a triggering event associated with the handover; and means for performing synchronization with respect to one or more cell-controlled parameters of the source cell upon returning to the coverage of the source cell.

A fourth aspect described herein relates to a computer program product, which can include a computer-readable medium that comprises code for causing a computer to initialize a handover from a source cell to a target cell; code for causing a computer to return to coverage of the source cell upon detecting a triggering event associated with the handover; and code for causing a computer to perform synchronization with respect to one or more cell-controlled parameters of the source cell upon returning to the coverage of the source cell.

According to a fifth aspect, a method is described herein. The method can comprise receiving a message initializing a change of communication service from a source cell to a target cell; returning to communication service of the source cell upon identifying a failure in the change of communication service; and reverting to at least one of a discontinuous transmission (DTX) configuration or a discontinuous reception (DRX) configuration utilized prior to reception of the message initializing the change of communication at least in part by instructing a physical layer entity to consider only DTX/DRX orders which were acknowledged prior to an activation time of the message initializing the change of communication.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
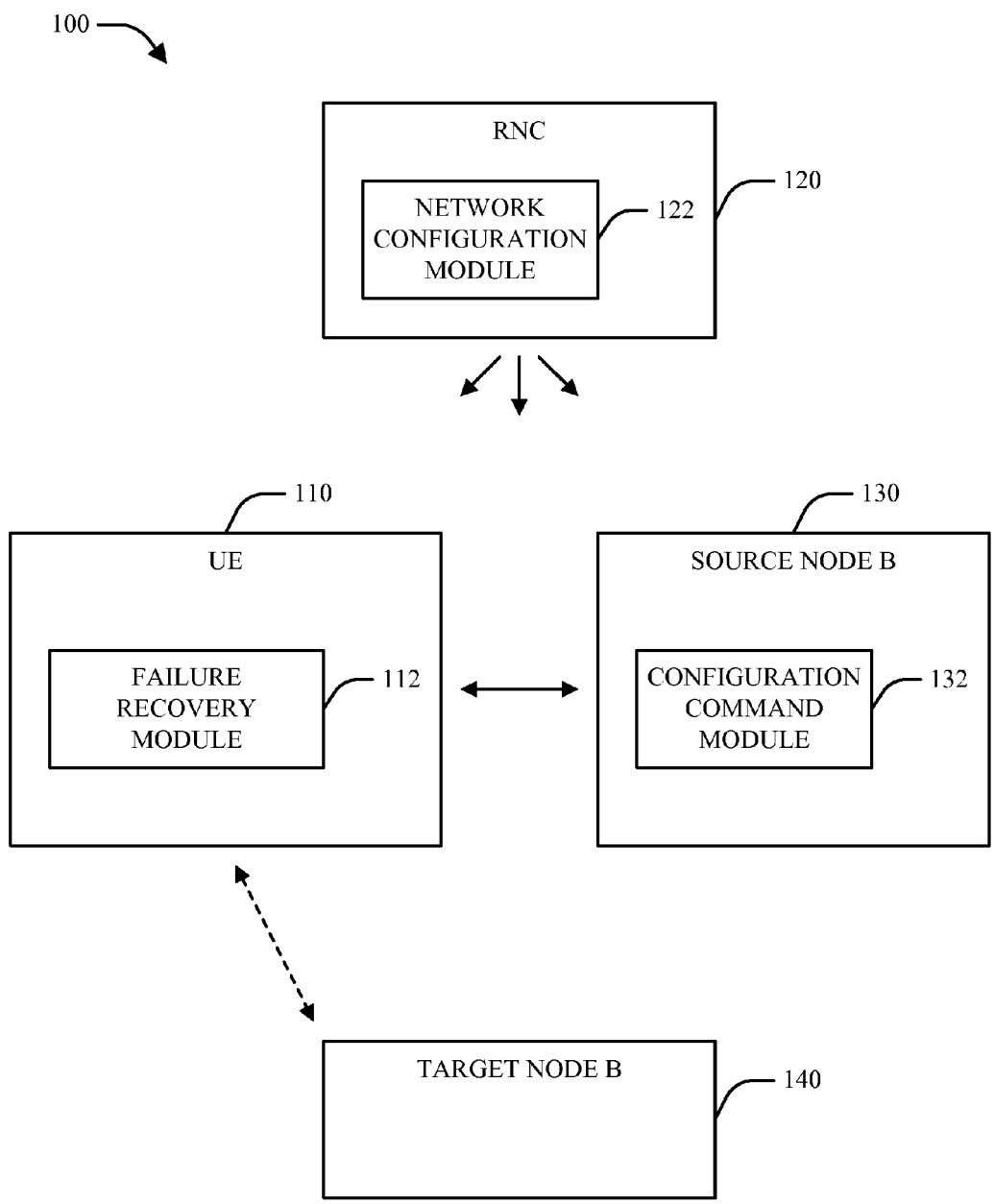
FIG. 1 is a block diagram of a system for synchronizing a user device and an associated wireless communication network in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards.

A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 for synchronizing a user device, such as a UE 110, and an associated wireless communication network in accordance with various aspects described herein. As FIG. 1 illustrates, system 100 can include one or more UEs 110 (access terminals (ATs), users, user devices, mobile terminals, etc.), which can communicate with one or more Node Bs (network cells, base stations, Evolved Node Bs (eNBs), access points (APs), etc.), such as a source Node B 130 and a target Node B 140. In one example, UE 110 can engage in one or more uplink (UL, also referred to as reverse link (RL)) communications to source Node B 130 and/or target Node B 140, and Node Bs 130 and/or 140 can engage in one or more downlink (DL, also referred to as forward link (FL)) communications to UE 110.

Devices operating in a wireless communication system can operate according to various configuration factors, which can be determined in a global fashion by a radio network controller (RNC) 120 and/or another suitable entity. For example, a RNC 120 can utilize a network configuration module 122 and/or other suitable means to configure and/or control various entities in system 100. While shown in system 100 as a standalone entity, it should be appreciated that RNC 120 could also be incorporated wholly or in part by one or more UEs 110, Node Bs 130 and/or 140, and/or any other suitable entity in system 100.

In addition to parameters specified by a RNC 120, UE 110 can operate according to parameters ordered or otherwise specified by source Node B 130. In one example, configuration parameters specified by source Node B 130 can be provided via a configuration command module 132 and/or any other suitable mechanism(s) associated with source Node B 130. In accordance with one aspect, UE 110 can be configured by source Node B 130 to utilize continuous packet connectivity (CPC), which can leverage features such as discontinuous transmission (DTX) and/or discontinuous reception (DRX) to facilitate continuous connectivity to data users during periods of data inactivity. CPC can yield various advantages; for example, CPC can offer continuous connectivity to data users during periods of data inactivity in order to reduce delay (e.g., less than 50 ms) when reconnecting. Additionally or alternatively, CPC can offer continuous connectivity to data users with an overall reduction to the overhead associated with re-activation while at the same time reducing interference to active users, preserving the UE battery life, and yielding other suitable benefits.

In accordance with one aspect, source Node B 130 can configure UE 110 to utilize CPC features such as UL DTX and DL DRX to reduce interference, to save power consumption and/or battery life of UE 110, and/or to yield other appropriate benefits. For example, source Node B 130 can specify a UL Downlink Physical Control Channel (DPCCH) DTX pattern to facilitate UL synchronization when UE 110 is in UL DTX mode. Similarly, it can be appreciated that DL DRX operations of UE 110 can additionally be controlled by source Node B 130 and/or other suitable entities in system 100.

In one example, CPC can be utilized within system 100 for various use cases, such as those involving applications with appreciable duration of inactivity after which users resume transmission of data packets. These applications can include, for example, Voice over Internet Protocol (VoIP), Video over IP, gaming applications, or the like. Thus, it can be appreciated that the concept of CPC refers to maintaining control channels of a UE 110 even during periods of no data transmission while at the same time reducing the interference caused to active users by maintaining such control channels for inactive users.

In accordance with one aspect, configuration of CPC within system 100 can involve semi-static and/or dynamic parameter settings. In one example, due to the utilization of a global parameter, DTX and DRX configuration can take place substantially simultaneously via a global parameter setting. In general, CPC configuration between UE 110 and source Node B 130 can occur in the event that UE 110 and source Node B 130 both utilize a radio technology that includes support for CPC and both UE 110 and source Node B 130 are capable of supporting CPC. In one example, CPC can be initiated by UE 110 by providing a message to source Node B 130 and/or another suitable entity in system 100 that UE 110 supports CPC. Subsequently, UE 110 and source Node B 130 can perform one or more synchronization procedures such that CPC can be conducted between UE 110 and source Node B 130. During CPC operation, source Node B 130 can provide respective commands or "orders" to UE 110 (e.g., via configuration command module 132) to enable or disable CPC and/or one or more features thereof (e.g., DTX, DRX, etc.). Upon receipt of such an order, UE 110 can acknowledge the order and activate/deactivate respective CPC features as provided in the order. Various examples of how CPC can be initiated and maintained between a mobile user and an associated network are illustrated in further detail herein.

Figure 2:
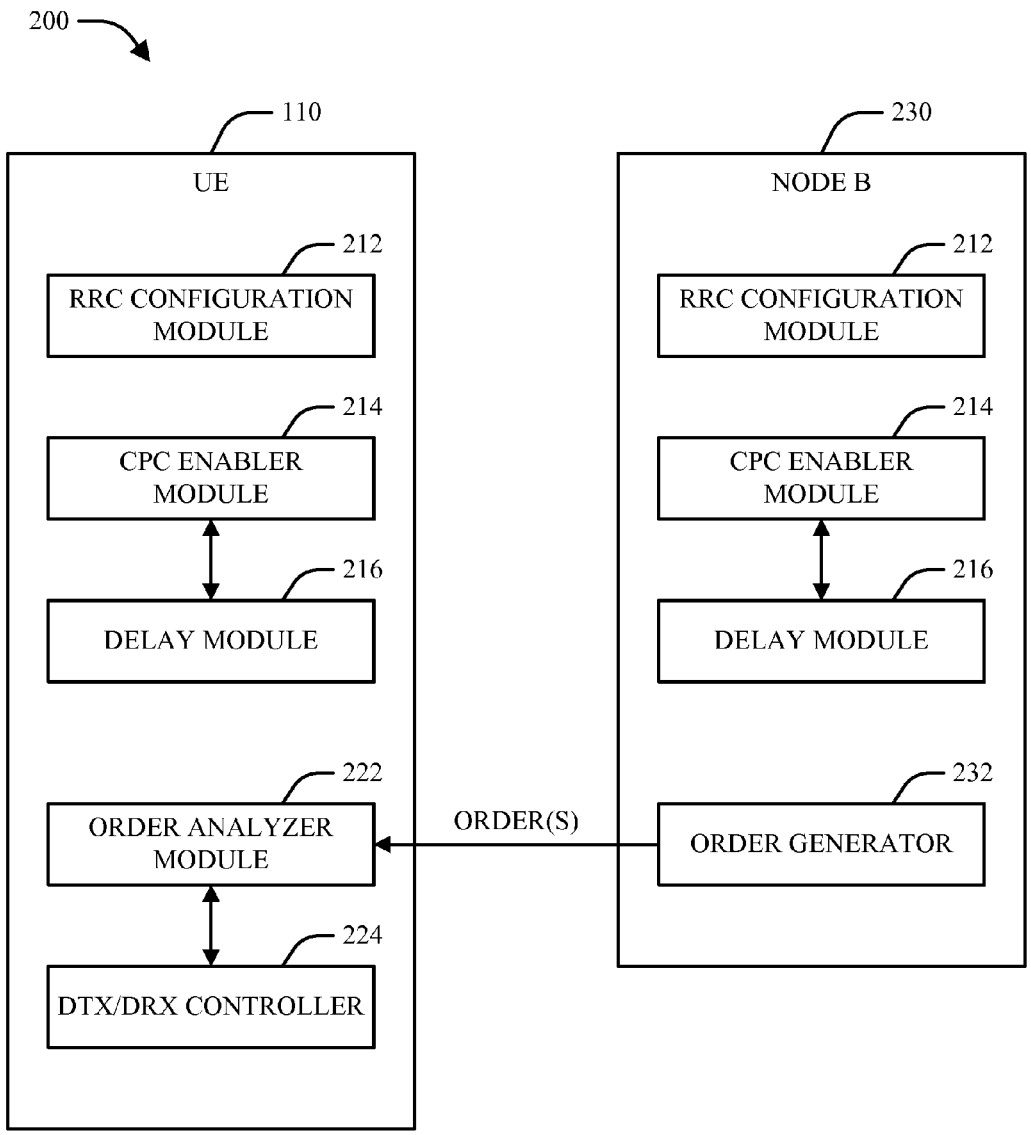
FIG. 2 is a block diagram of a system for establishing and controlling continuous packet connectivity (CPC) in a wireless communication environment in accordance with various aspects.

FIG. 2 is a block diagram of a system 200 that illustrates establishment and control of CPC functions, such as DTX and/or DRX, between a UE 110 and an associated Node B 230 in further detail. As shown in FIG. 2, UE 110 and Node B 230 in system 200 can include a Radio Resource Control (RRC) configuration module 212, which can facilitate initialization configuration of DTX, DRX, and/or any other suitable parameters (e.g., via RRC messaging). For example, UE 110 can utilize RRC configuration module 212 to provide RRC messaging to Node B 230 relating to its ability to support CPC, based on which an RRC configuration module 212 at Node B 230 can initialize network-side CPC configuration for UE 110.

Subsequent to initial configuration by RRC configuration modules 212, a CPC enabling module 214 at UE 110 and/or Node B 230 can be utilized to enable DTX, DRX, or the like between UE 110 and Node B 230. In one example, a delay module 236 can also be utilized to specify a delay for enabling CPC operation in order to ensure synchronization of UE 110 and Node B 230. In one example, upon enablement of CPC, Node B 230 can transmit orders to UE 110 via an order generator 232 and/or other suitable means to deactivate or (re)activate DTX, DRX, or the like. At UE 110, an order analyzer 222 can receive and analyze such orders, based on which an associated DTX/DRX controller 224 can activate or deactivate DTX or DRX as appropriate according to the received orders.

Figure 3:
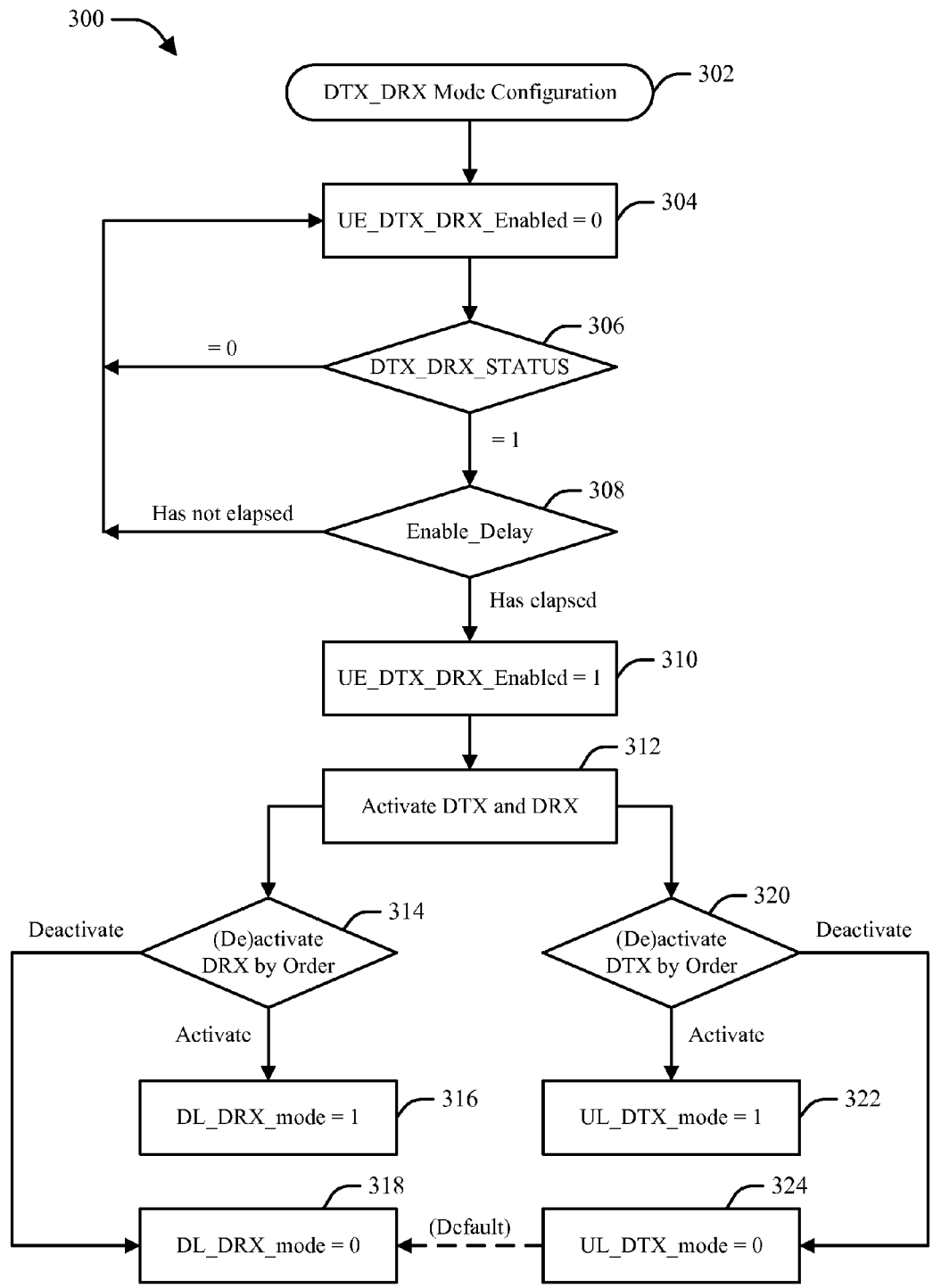
FIGS. 3-4 illustrate respective example CPC configuration procedures that can be utilized by a wireless communication network in accordance with various aspects.

An example procedure that can be utilized by UE 110 and Node B 230 to enable and control CPC operation is provided by flow diagram 300 in FIG. 3. It should be appreciated, however, that the procedure illustrated by flow diagram 300 is provided by way of example and not limitation and that, unless explicitly stated otherwise, the hereto appended claims are not intended to be limited to any specific implementation.

As shown in flow diagram 300, the procedure can begin at block 302, wherein UE 110 and Node B 230 begin configuration of CPC modes such as DTX and DRX. Additionally, a variable UE_DTX_DRX_Enabled is initialized to 0 as shown at block 304.

Concurrently, UE 110 and/or Node B 230 can maintain a variable DTX_DRX_STATUS that indicates whether configuration of the associated DTX and DRX modes has completed (e.g., such that the variable is set equal to 1 upon completion or 0 otherwise). Thus, at block 306, the procedure can be configured to loop between blocks 304 and 306 until DTX/DRX configuration is completed. In addition, upon completion of such configuration, UE 110 and Node B 230 can be further configured to wait for a predefined synchronization delay period specified by Enable_Delay. This is shown by block 308. Upon expiration of this predefined synchronization delay, UE 110 and/or Node B can set the variable UE_DTX_DRX_Enabled to 1 as shown at block 310 to indicate that DTX and DRX are active and ready for configuration and subsequent use. Further, DTX and/or DRX can be activated, as shown in block 312.

In accordance with one aspect, an Enable_Delay parameter as utilized at block 308 can be defined in terms of a period of time (e.g., provided in subframes, milliseconds, and/or any other suitable unit) that facilitates synchronization between associated network entities in connection with enablement of CPC operation. For example, upon initializing and enabling CPC, UE 110 and Node B 230 can be configured (e.g., via delay module 216) to wait for expiration of a predetermined synchronization period (e.g., 100 subframes or its equivalent in ms) prior to activating and utilizing DTX and/or DRX.

In accordance with another aspect, DTX and/or DRX operation can be activated at block 312 such that Node B 230 and UE 110 can conduct DTX/DRX communication. Subsequently, the procedure illustrated by flow diagram 300 can continue from block 312 according to orders provided by Node B 230 to UE 110. Thus, for example, upon receiving an order relating to DRX, UE 110 can analyze the order as shown at block 314. If it is determined that the order requires activation of DRX, the UE 110 can activate DRX and set an associated variable DL_DRX_mode to 1 as shown at block 316. Otherwise, if the order requires deactivation of DRX, the UE 110 can instead deactivate DRX and set the variable DL_DRX_mode to 0 as shown at block 318. Similarly, the UE 110 can process orders relating to DTX by activating/deactivating DTX and maintaining a variable UL_DTX_mode as shown by blocks 320, 322, and 324. As further shown by flow diagram 300, UE 110 can be optionally configured to deactivate DRX as shown at block 318 by default upon deactivation of DTX.

Figure 4:
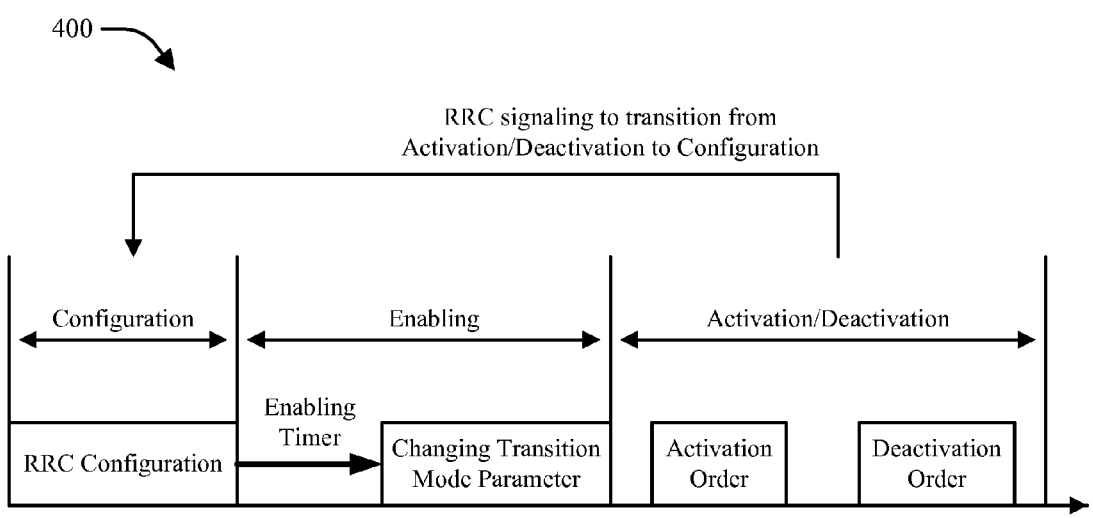

In accordance with one aspect, operation of the procedure illustrated by flow diagram 300 in time is shown by diagram 400 in FIG. 4. As shown by diagram 400, a CPC DRX/DTX mode control procedure can be divided into three steps or phases: a configuring phase, an enabling phase, and an activation/deactivation phase. Such steps can be conducted iteratively; for example, reconfiguration-related RRC messages can be utilized to bring the illustrated procedure from the activation/reactivation phase back to the configuration phase.

In one example, the configuration phase can be conducted via RRC high-level signaling and/or other suitable signaling from a wireless communication network to a UE in order to set a status parameter. For example, the status parameter can be required to be set or "turned on" before other, more detailed parameters (e.g., timing, cycles, etc.) of respective CPC modes can be effectuated. In accordance with one aspect, this RRC CPC mode configuration, done via setting a DTX_DRX_STATUS variable as shown in flow diagram 300 or the like, can serve as a "main switch" to turn DTX/DRX mode on or off.

As further shown in diagram 400, an enabling phase can follow the configuration phase to enable respective DTX/DRX modes. In one example, the enabling phase can be required during CPC initialization and/or at any other suitable time. In accordance with one aspect, at UE initialization and/or CPC initialization stages, associated DTX and DRX modes can be assumed to be disabled. As further shown by diagram 400, an enabling timer (e.g., Enable_Delay) can be used as a delay buffer during the CPC mode transition from disabled to enabled. Upon expiration of the timer, the enabling phase can be completed and an associated UE can be configured to stay in an CPC DTX/DRX enabled mode unless the procedure illustrated by diagram 400 falls back to the configuration step due to RRC signaling from the associated network.

Upon enabling of the DTX and DRX modes, a dynamic activation/deactivation phase can occur at any time. The function of the activation/deactivation phase is to utilize network orders, such as High-Speed Shared Control Channel (HS-SCCH) orders provided to a UE by an associated network or the like, to activate or deactivate DRX and/or DTX modes on the fly as generally described above. Once in the activation/reactivation phase, an associated UE can fall back to the configuration phase upon receiving an RRC reconfiguration message (e.g., RRC CONNECTION SETUP, ACTIVE SET UPDATE, CELL UPDATE CONFIRM, etc.) and/or any other suitable command(s).

In view of the above, it can be appreciated that, in general, a UE operating in a CPC-enabled mode can in some cases be required to listen on one or more control channels for HS-SCCH orders and/or other commands from an associated Node B in order to determine whether to activate or deactivate DTX and/or DRX modes and/or to perform any other suitable action(s). In one example, such orders and/or other commands can be provided to a UE in addition to other configuration parameters provided by a RNC and/or another suitable network controller entity. However, as described in further detail below, complications can arise with respect to such operation in the case of a handover failure and/or other similar scenarios.

Figure 5:
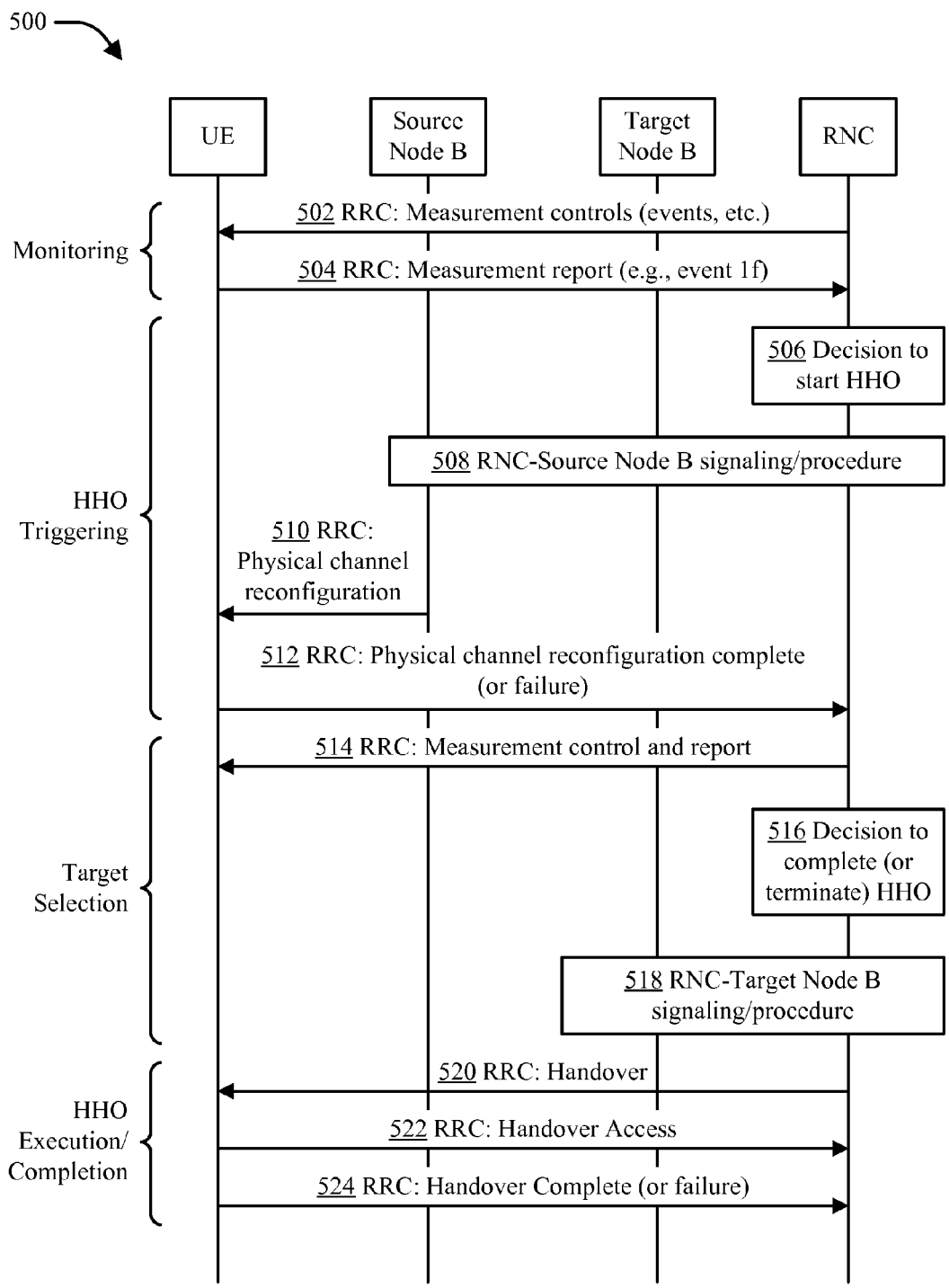
FIG. 5 illustrates an example handover procedure that can be utilized in a wireless communication system in accordance with various aspects.

Returning to FIG. 1, it can be appreciated that upon satisfaction of various criteria within system 100, UE 110 can perform a handover or handoff procedure wherein UE 110 moves from the coverage of source Node B 130 to a target Node B 140. Such a handover can be a hard handover (HHO), a soft or softer handover, or the like. Further, various types of HHO that can be conducted include inter-frequency HHO, inter-radio access technology (RAT) HHO, inter-system HHO, or the like. It should be appreciated, however, that the claimed subject matter herein is not intended to be limited to specific handover procedures unless explicitly recited otherwise. In one example, an example of a handover that can be conducted between a UE 110 and respective Node Bs 130-140 is illustrated by diagram 500 in FIG. 5. In particular, diagram 500 illustrates respective steps 502-524, which can be executed by respective corresponding network entities to facilitate monitoring, handover triggering, target selection, handoff execution/completion, and/or any other appropriate acts to facilitate a handover (e.g., via RRC messaging and/or any other suitable means). While various aspects of diagram 500 are illustrated for a HHO, it should be appreciated that any suitable handover could be conducted in a similar manner to that illustrated by diagram 500.

Upon failure of a handover (e.g., failure to complete an initiated handover, a physical channel failure associated with the handover, failure to complete a cell change order, etc.), a mobile device is traditionally instructed to return to the source cell and to revert to a prior configuration. By way of specific example, with reference to diagram 500, a physical channel reconfiguration as illustrated at step 512 can reach a target Node B for a related handover in the case of successful execution. Alternatively, in the event that physical channel reconfiguration fails, said operation as illustrated at step 512 can instead reach the source Node B. More generally, however, it should be appreciated that a handover failure can occur during any portion(s) of a handover. Thus, with reference again to diagram 500, while the possibility of failure events are listed explicitly only for steps 512, 516, and 524, it should be appreciated that any step within diagram 500 could result in failure.

As shown by system 100, UE 110 can utilize a failure recovery module 112 and/or other suitable means to revert back to a configuration previously associated with source Node B 130 upon reestablishing communication between UE 110 and source Node B 130 following failure of a handover and/or any other diversion of communication service from source Node B 130. Conventionally, upon such a failure or connection reestablishment, UE 110 can revert to a previous configuration based on shared network parameters as provided by RNC 120 or similar entities in system 100.

However, it can be appreciated that as UE 110 has been diverted from source Node B 130, UE 110 can in some cases be unaware of the presence or absence of HS-SCCH orders and/or other messages or orders relating to cell-controlled parameters (e.g., such as DTX/DRX or the like) that occurred during the diversion. Thus, by way of specific example, if HS-SCCH orders are transmitted by source Node B 130 during a handover and UE 110 later returns to source Node B 130 following a failure of that handover, conventional wireless communication systems do not specify to which state UE 110 should revert with respect to the configuration parameters relating to such orders, nor do conventional wireless communication systems specify which and to what extent such orders should be taken into account by UE 110. It can be appreciated that, in order to ensure synchronization between UE 110 and other entities in system 100, such as RNC 120, source Node B 130, and the like, it would be desirable to more clearly define and implement measures by which handling of HS-SCCH orders and/or other commands provided by source Node B 130 during a failed handover are subsequently handled by UE 110 and/or by which Node B-altered configurations are preserved or handled by UE 110 upon a handover failure.

In accordance with one aspect, it should be appreciated that in general, the synchronization and failure recovery techniques described herein can be applied in any scenario involving a reversion to an older configuration wherein it is desired to apply a lower level configuration. Thus, while respective examples are provided herein with respect to the specific case of a handover (such as a hard handover), it should be appreciated that the various aspects given by the descriptions and illustrations herein can be applied to any suitable scenario, such as a handover failure, a physical channel failure, a cell change order failure, and/or any other scenario wherein Node B-ordered parameters may have been omitted, erroneously received, and/or misapplied. Further, it should be appreciated that the various aspects described and illustrated herein can be applied in the context of one or more physical channel failures that enable use of failure recovery resynchronization procedures as described herein (e.g., any physical channel failure that can initiate utilization of a recovery synchronization procedure).

Figure 6:
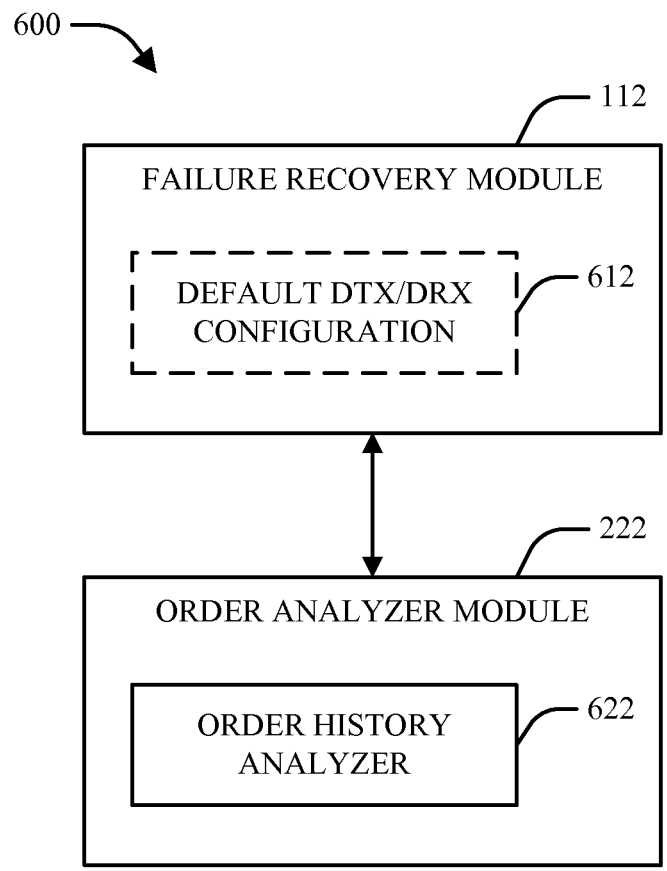
FIG. 6 is a block diagram of a system for reverting CPC configuration parameters upon occurrence of a handover failure in accordance with various aspects.

In accordance with another aspect, upon occurrence of a handover failure and/or any other suitable case for which reversion of a CPC configuration is desired, failure recovery module 112 can be utilized in cooperation with order analyzer 222 as illustrated in system 200 to revert respective CPC configuration parameters to a desired state. This is illustrated by system 600 in FIG. 6.

As shown by system 600, DTX/DRX status and/or other suitable operating parameters can be synchronized at an associated UE and/or Node B in various manners when a handover fails and/or another suitable scenario occurs. As a first example, failure recovery module 112 can be configured with a default DTX/DRX state configuration 612. Accordingly, upon determining that reversion of DTX/DRX status is desirable, the default DTX/DRX state configuration 612 can be used to revert an associated DTX status and DRX status to respective default configurations. Default DTX/DRX state configuration 612 can be a predetermined default configuration (e.g., a configuration that would be applied in the event that no HS-SCCH orders are received), a non-DTX, non-DRX status (e.g., a DTX disabled state and a DRX disabled state), or the like.

Additionally or alternatively, failure recovery module 112 can be utilized to revert DTX and DRX configurations to respective last DTX and DRX configurations utilized at a specified action time (e.g., upon initialization of a handover that later fails). In accordance with one aspect, order analyzer 222 can be utilized to determine the last configuration common to an associated UE and Node B based on various factors. For example, order analyzer 222 can utilize a order history analyzer 622 and/or other suitable mechanisms to utilize a history of HS-SCCH orders and/or other provided commands in various manners, based on which the last DTX and DRX configurations can be determined.

Figure 7:
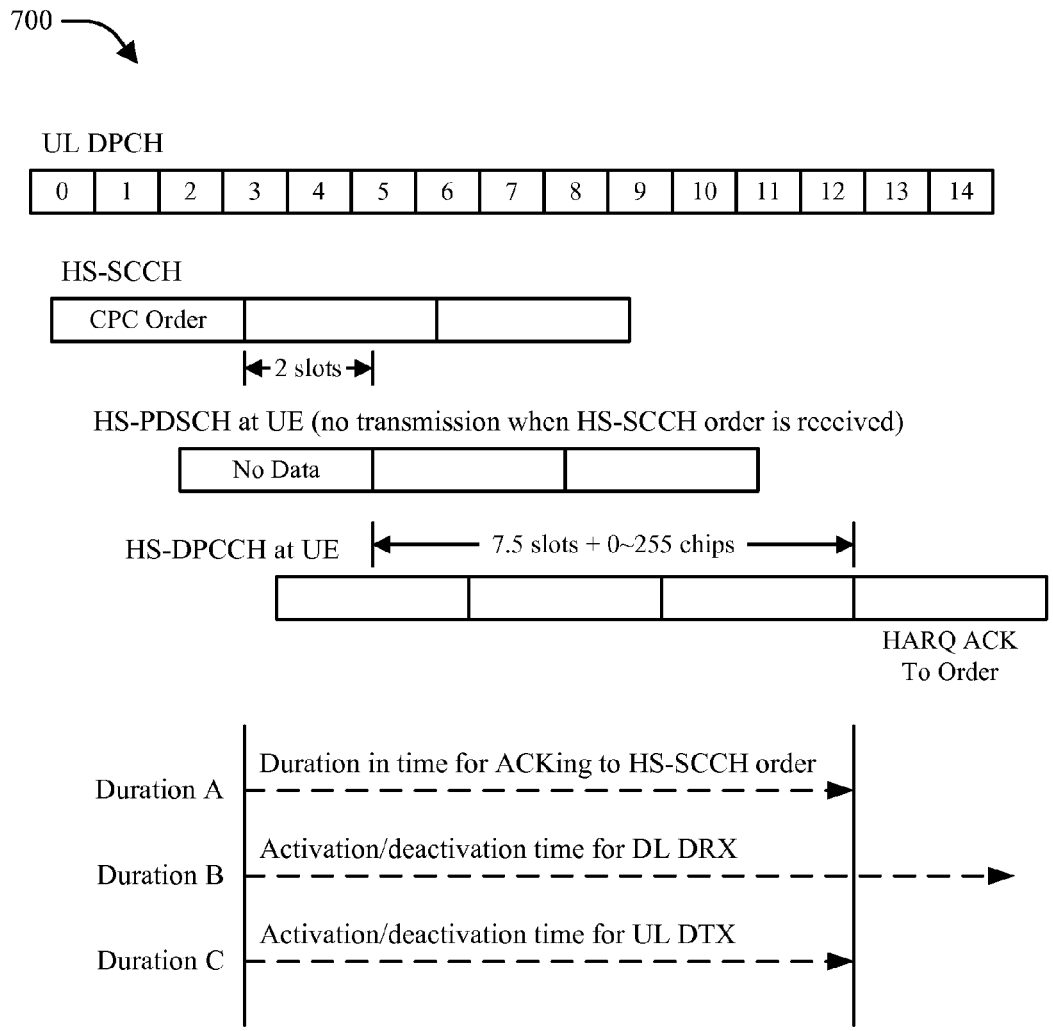
FIG. 7 illustrates an example order timeline that can be utilized in association with various aspects described herein.

In accordance with one aspect, order history analyzer 622 can utilize various predefined time durations in its analysis. By way of example, diagram 700 in FIG. 7 illustrates an example order timeline that can be leveraged by order history analyzer 622. As initially shown in diagram 700, an UL Dedicated Physical Channel (DPCH) and/or other suitable associated channels can operate in time according to radio frames, of which one radio frame is shown in diagram 700. Respective radio frames can be of any suitable length in time (e.g., 10 ms, etc.) and can be divided into respective (e.g., 15) slots. The structure of the UL DPCH, and/or that of other suitable structures, can serve as a timing reference for other channels depicted in diagram 700.

As next shown in diagram 700 and as generally described herein, orders can be provided to an associated user on HS-SCCH and/or another suitable shared control channel. In one example, a High-Speed Physical Downlink Shared Channel (HS-PDSCH) can be configured for data communication from a network cell to a served user such that no data is transmitted during transmission of an order on HS-SCCH.

Thus, it can be appreciated that the presence of an order on HS-SCCH can be indicated by the absence of data on HS-PDSCH at a predetermined time period. As shown in diagram 700, the time period associated with an order can be equivalent to three slots in time and/or any other suitable length. As further shown in diagram 700, an associated user can require a predetermined time period (e.g., 2 slots) to detect and decode an order. Further, upon another predetermined time period (e.g., 7.5 slots, etc.), a user can provide an acknowledgement (ACK) for the received order on a High-Speed Dedicated Physical Control Channel (HS-DPCCH) and/or any other suitable channel.

As further shown in diagram 700, based on the above-described timeline, three durations (denoted as Durations A-C) can be defined for use by order history analyzer 622. In a first example, Duration A can be utilized to represent the time duration between a time at which an order is received and a time at which it is acknowledged. In a second example, as a mobile user receives an order, it can be appreciated that the content of the order could require deactivation or reactivation of DRX. Accordingly, Duration B can be utilized to represent the time duration between a time at which an order to deactivate or reactivate DRX is received and a time at which such deactivation/reactivation occurs. In one example, such deactivation or reactivation according to an order can be applied by the mobile user twelve slots after the ending of the HS-SCCH subframe that delivered the order.

Similarly, in a third example, Duration C can be utilized to represent a time duration between a time at which an order to deactivate or reactivate DTX is received by a mobile user and a time at which such activation/reactivation is performed by the mobile user. In one example, activation or deactivation of discontinuous UL DPCCH transmission operation can be applied by a mobile user at the earliest Enhanced Dedicated Channel (E-DCH) transmission time interval (TTI) boundary that coincides with or follows the beginning of the HS-DPCCH subframe containing a Hybrid Automatic Repeat Request (HARQ) ACK corresponding to the order, and/or at any other suitable time.

Returning to FIG. 6, based on the above definitions, system 600 can determine the last DTX/DRX configuration common to an associated mobile device and its corresponding network in one or more of the following manners. In a first example, order history analyzer 622 can identify last DTX and DRX configurations according to respective DTX orders and DRX orders for which acknowledgements were transmitted prior to initiation of the handover and/or other event causing the reversion. Thus, based on Duration A as defined in diagram 700, for each received order, if the handover and/or other event causing the reversion was initiated before transmission of the order's acknowledgement (e.g., after Duration A subsequent to reception of the order), the order is not applied to the configuration. Otherwise, the order is applied.

In a second example, order history analyzer 622 can identify last DTX and DRX configurations according to at least one of respective DTX orders received after a DTX activation window subsequent to initiation of the handover and/or other event causing the reversion or respective DRX orders received after a DRX activation window subsequent to initiation of the handover and/or other event causing the reversion. Thus, based on Duration A or Duration B as defined in diagram 700, in the event that an order message carries one order (e.g., either DTX or DRX but not both), for each received order, if the handover and/or other event causing the reversion was initiated before the activation time of the DTX or DRX (e.g., after Duration B or C subsequent to reception of the order), the order is not applied to the configuration. Otherwise, the order is applied.

In a third example, order history analyzer 622 can identify last DTX and DRX configurations according to respective DTX orders and DRX orders received after a DTX activation window subsequent to initiation of the handover and/or other event causing the reversion. Thus, based on a maximum of Duration B and Duration C, in the event that an order message carries both DTX and DRX orders, for each received order, if the handover and/or other event causing the reversion was initiated before the activation time of the DRX, the order is not applied to the configuration. Otherwise, the order is applied.

In a fourth example, order history analyzer 622 can identify last DTX and DRX configurations according to respective DTX orders and DRX orders received after a DRX activation window subsequent to initiation of the handover and/or other event causing the reversion. Thus, based on a minimum of Duration B and Duration C, in the event that an order message carries both DTX and DRX orders, for each received order, if the handover and/or other event causing the reversion was initiated before the activation time of the DTX, the order is not applied to the configuration. Otherwise, the order is applied.

With respect to the Duration A-based approach described above, it can be appreciated that if a handover failure and/or another event based on which reversion is desired occurs before or during Duration A in diagram 700, then an associated UE and Node B and/or RNS can be configured to ignore a received HS-SCCH order if the handover fails and the UE returns to its source Node B and/or another appropriate triggering event occurs, such that the CPC DTX/DRX feature can stay as it was before. Alternatively, if a handover failure and/or another event based on which reversion is desired occurs after Duration A in diagram 700, it can be appreciated that the associated UE and Node B and/or RNC can be configured to consider the effect of the received HS-SCCH order.

By way of further example, in the event of a physical channel failure (e.g., messages are communicated in connection with a handover and/or another suitable procedure that causes a UE to attempt establishment of one or more dedicated physical channels and such establishment fails), an associated UE that implements system 600 can recover from such failure by reverting to the configuration prior to the reception of the message that initialized the failed physical channel establishment, including any HS-DSCH, and/or E-DCH configurations and/or DTX and DRX configurations if such configurations exist. If DTX and/or DRX configurations exist, a UE incorporating system 600 can recover such configurations by instructing an associated physical layer entity to consider only HS-SCCH orders which were acknowledged prior to the activation time of the received message.

In another example, upon a handover failure and/or another suitable triggering event, system 600 can be configured to facilitate synchronization with respect to at least one of DTX configuration or DRX configuration upon expiration of a predefined synchronization delay following reestablishment of communication between an associated UE and Node B. Thus, for example, prior to reverting to a selected DTX/DRX status as generally described above, a predefined delay (e.g., the Enabling_Delay parameter utilized above and/or another suitable delay parameter) can be implemented. By delaying DTX/DRX reconfiguration in this manner, it can be appreciated that re-synchronization between an associated UE and Node B can be enhanced by allowing both entities adequate time to perform the re-synchronization.

More particularly, the above re-synchronization delay can be implemented by reconfiguring an associated physical layer entity to perform discontinuous UL DPCCH transmission and to enable or disable DRX/DTX orders according to a variable DTX_DRX_PARAMS or the like at a connection frame number (CFN) corresponding to the frame boundary that is offset by the stored value of the information element Enabling_Delay from the frame boundary where UL transmission resumes with the old configuration.

In accordance with one aspect, while the above specific example is provided in relation to a physical channel failure, the techniques described therein can be applied to any suitable handover failure condition and/or other triggering event, such as a failure to complete a handover, a failure to complete a cell change order, and/or any other suitable event.

Figure 8:
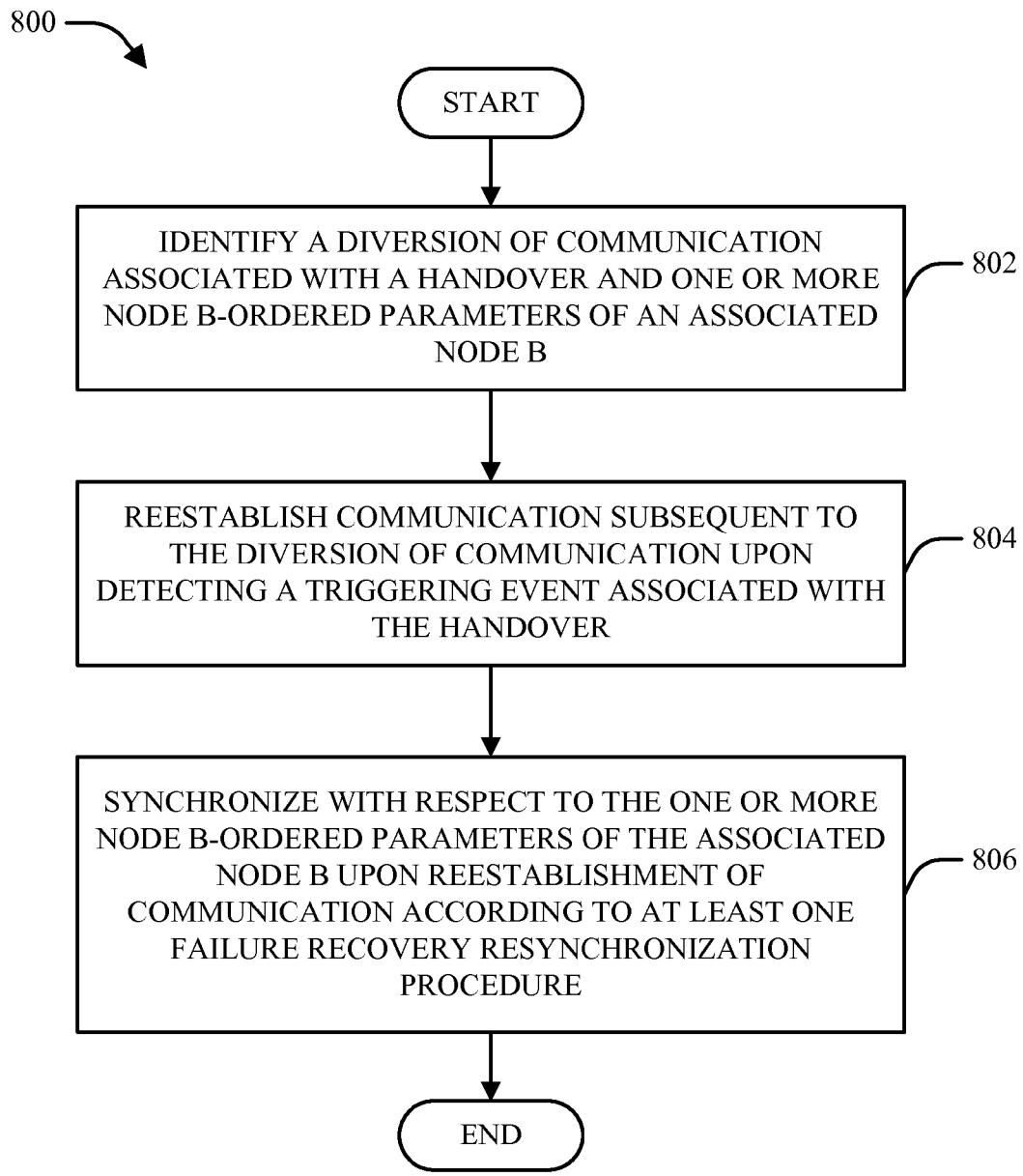
FIGS. 8-10 are flow diagrams of respective methodologies for synchronization of Node B-specified orders.
Figure 9:
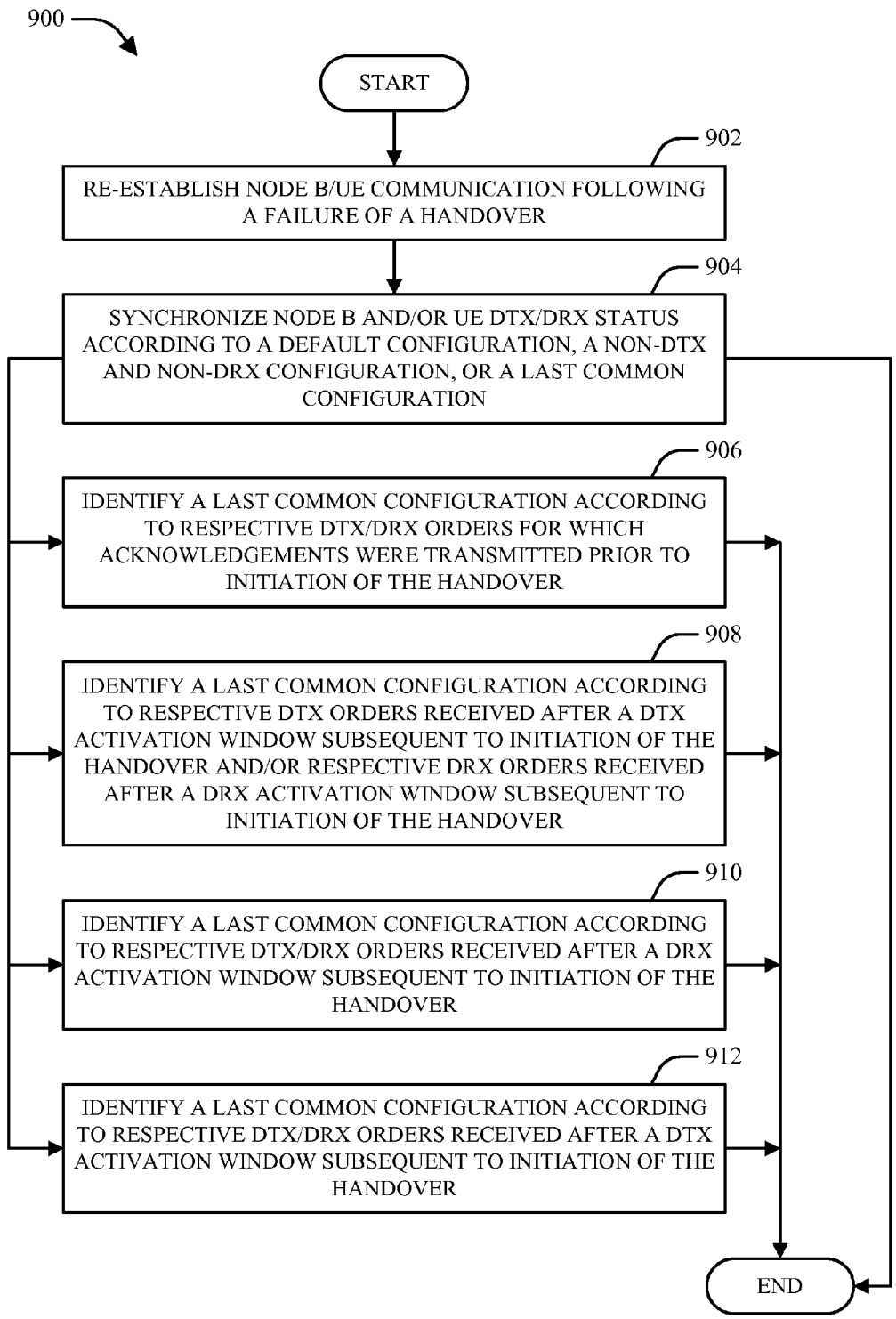
Figure 10:
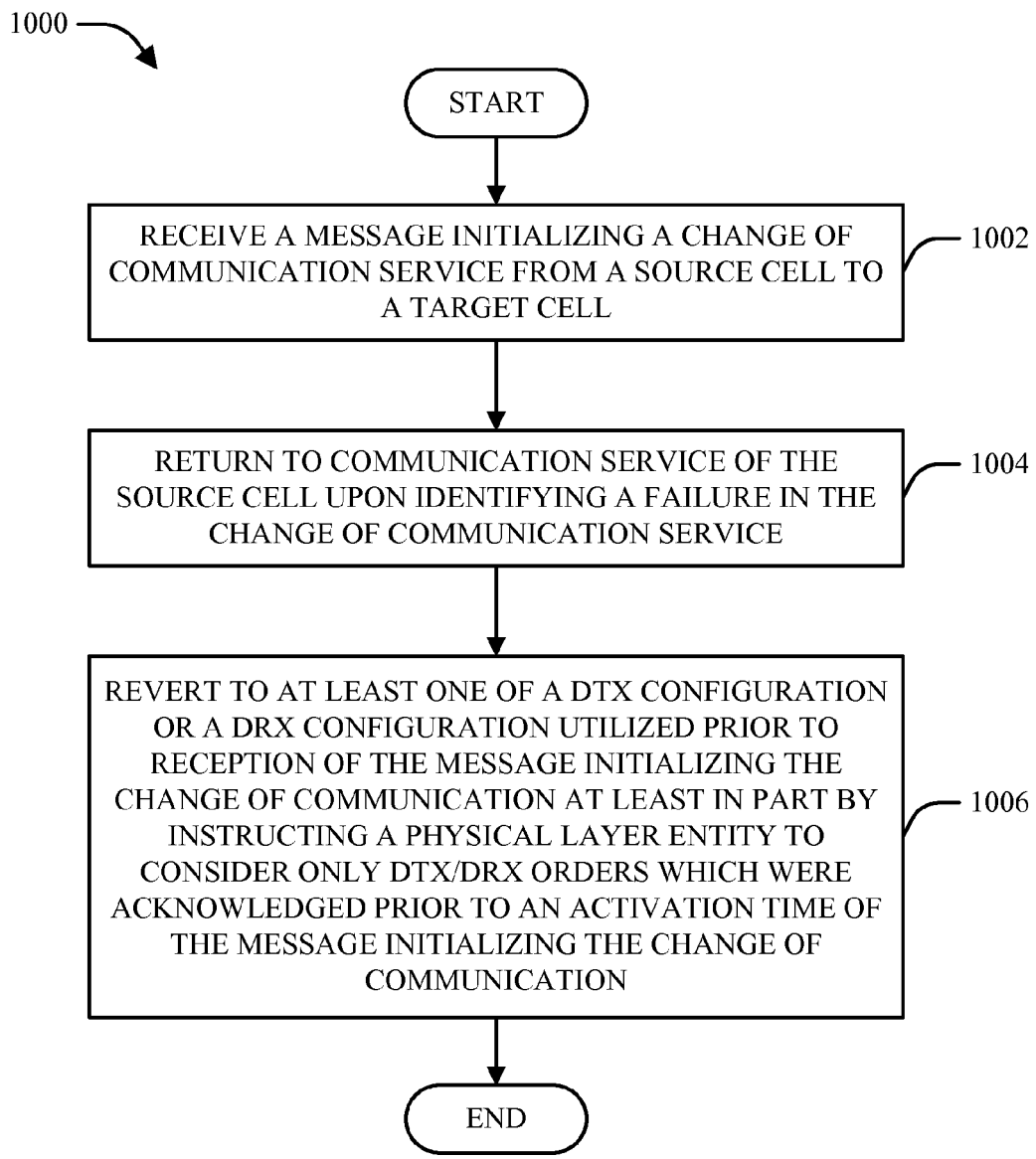

Referring now to FIGS. 8-10, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 8, illustrated is a methodology 800 for synchronization of Node B-specified orders (e.g., during a handover failure). It is to be appreciated that methodology 800 can be performed by, for example, a user device (e.g., UE 110), a network cell (e.g., source Node B 130 and/or target Node B 140), and/or any other appropriate network entity. Methodology 800 begins at block 802, wherein a diversion of communication (e.g., between a UE 110 and a source Node B 130) associated with a handover (e.g., a handover of a UE 110 from source Node B 130 to target Node B 140) and one or more Node B-ordered parameters of an associated Node B (e.g., source Node B 130) are identified. Next, at block 804, communication (e.g., between UE 110 and source Node B 130) is reestablished subsequent to the diversion of communication identified at block 802 upon detecting a triggering event associated with the handover (e.g., a handover failure, etc.). Methodology 800 can then conclude at block 806, wherein synchronization is performed with respect to the one or more Node B-ordered parameters of the associated Node B upon reestablishment of communication as performed at block 804 according to at least one failure recovery resynchronization procedure.

In accordance with one aspect, the identifying, reestablishing, and/or synchronizing as described above and illustrated in FIG. 8 can be performed by the associated Node B referred to within methodology 800. Additionally or alternatively, the associated Node B can be a serving Node B for a UE that performs some or all of the identifying, reestablishing, and/or synchronizing as described above and illustrated in FIG. 8. In such an example, the handover referred to within methodology 800 can be a handover from the associated Node B to a target serving Node B for the UE, and the reestablishment as described at block 804 can occur upon identifying a failure associated with the handover to the target serving Node B.

Turning now to FIG. 9, a flow diagram of another methodology 900 for synchronization of Node B-specified orders is illustrated. Methodology 900 can be performed by a UE and/or a Node B involved in a handover and/or any other appropriate network entity. Methodology 900 begins at block 902, wherein Node B/UE communication is re-established following a failure of a handover. Next, at block 904, synchronization is performed relating to Node B and/or UE status according to a default configuration (e.g., default DTX/DRX state configuration 612), a non-DTX and non-DRX configuration, or a last common configuration.

Upon completion of the acts described at block 904, methodology 900 can conclude. Alternatively (e.g., in the event that a last common configuration is selected for use at block 904), methodology 900 can proceed to block 906, block 908, block 910, and/or block 912 (e.g., to identify the last common configuration) prior to concluding. At block 906, a last common configuration is identified according to respective DTX/DRX orders for which acknowledgements were transmitted prior to initiation of the handover. At block 908, a last common configuration is identified according to respective DTX orders received after a DTX activation window subsequent to initiation of the handover and/or respective DRX orders received after a DRX activation window subsequent to initiation of the handover. At block 910, a last common configuration is identified according to respective DTX/DRX orders received after a DRX activation window subsequent to initiation of the handover. At block 912, a last common configuration is identified according to respective DTX/DRX orders received after a DTX activation window subsequent to initiation of the handover.

FIG. 10 illustrates a third methodology 1000 for synchronization of Node B-specified orders. Methodology 1000 can be performed by, for example, a mobile device and/or any other appropriate network entity. Methodology 1000 begins at block 1002, wherein a message initializing a change of communication service from a source cell to a target cell is received. Next, at block 1004, an entity performing methodology 1000 returns to communication service of the source cell specified at block 1002 upon identifying a failure in the change of communication service associated with the message received at block 1002. Finally, methodology 1000 can conclude at block 1006, wherein an entity performing methodology 1000 reverts to at least one of a DTX configuration or a DRX configuration utilized prior to the reception of the message initializing the change of communication at block 1002 at least in part by instructing a physical layer entity to consider only DTX/DRX orders which were acknowledged prior to an activation time of the message initializing the change of communication as described above at block 1002.

Figure 11:
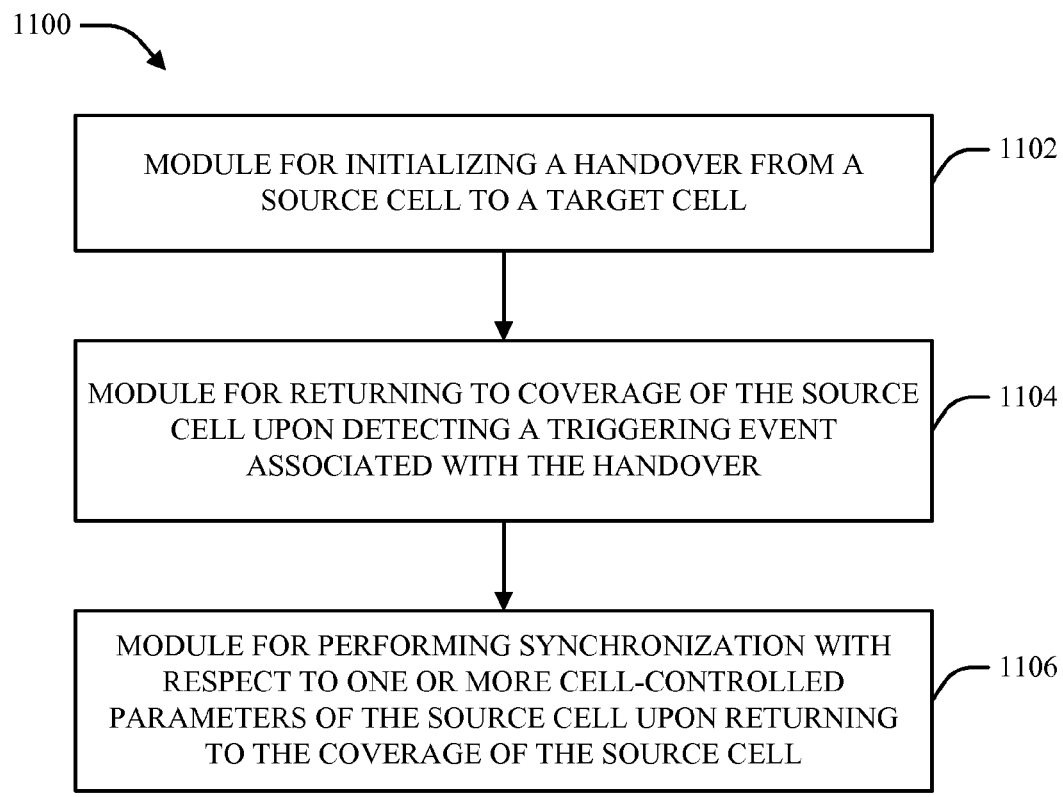
FIG. 11 is a block diagram of an apparatus that facilitates CPC synchronization subsequent to a handover failure in a wireless communication system.

Referring next to FIG. 11, an apparatus 1100 that facilitates CPC synchronization subsequent to a handover failure in a wireless communication system is illustrated. It is to be appreciated that apparatus 1100 is represented as including functional blocks, which can be functional blocks that represent functions implemented by a processor, software, or combination thereof (e.g., firmware). Apparatus 1100 can be implemented by a user device (e.g., UE 110), a Node B (e.g., source Node B 130), and/or any other suitable network entity and can include a module 1102 for initializing a handover from a source cell to a target cell, a module 1104 for returning to coverage of the source cell upon detecting a triggering event associated with the handover, and a module 1106 for performing synchronization with respect to one or more cell-controlled parameters of the source cell upon returning to the coverage of the source cell.

Figure 12:
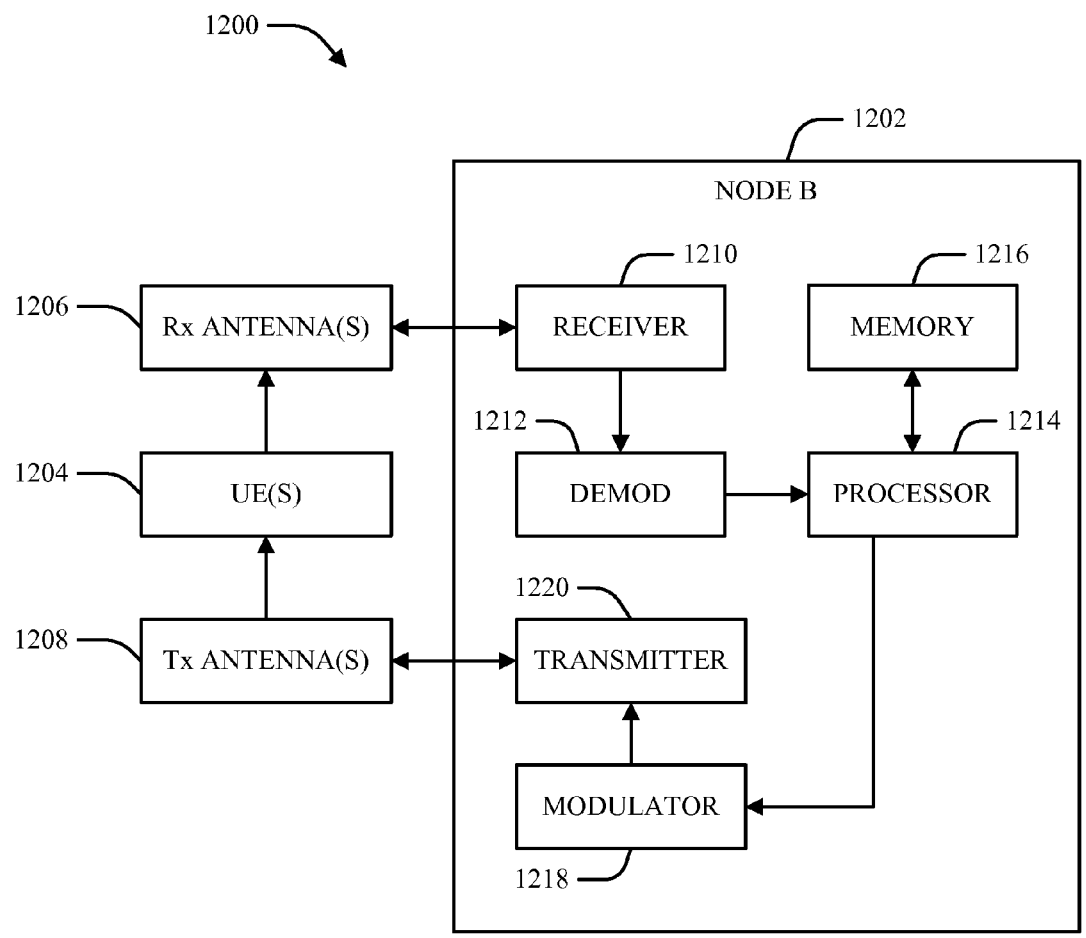
FIGS. 12-13 are block diagrams of respective wireless communication devices that can be utilized to implement various aspects described herein.

FIG. 12 is a block diagram of a system 1200 that can be utilized to implement various aspects of the functionality described herein. In one example, system 1200 includes a base station or Node B 1202. As illustrated, Node B 1202 can receive signal(s) from one or more UEs 1204 via one or more receive (Rx) antennas 1206 and transmit to the one or more UEs 1204 via one or more transmit (Tx) antennas 1208. Additionally, Node B 1202 can comprise a receiver 1210 that receives information from receive antenna(s) 1206. In one example, the receiver 1210 can be operatively associated with a demodulator (Demod) 1212 that demodulates received information. Demodulated symbols can then be analyzed by a processor 1214. Processor 1214 can be coupled to memory 1216, which can store information related to code clusters, access terminal assignments, lookup tables related thereto, unique scrambling sequences, and/or other suitable types of information. Additionally, Node B 1202 can employ processor 1214 to perform methodologies 800-1000 and/or other similar and appropriate methodologies. In one example, Node B 1202 can also include a modulator 1218 that can multiplex a signal for transmission by a transmitter 1220 through transmit antenna(s) 1208.

Figure 13:
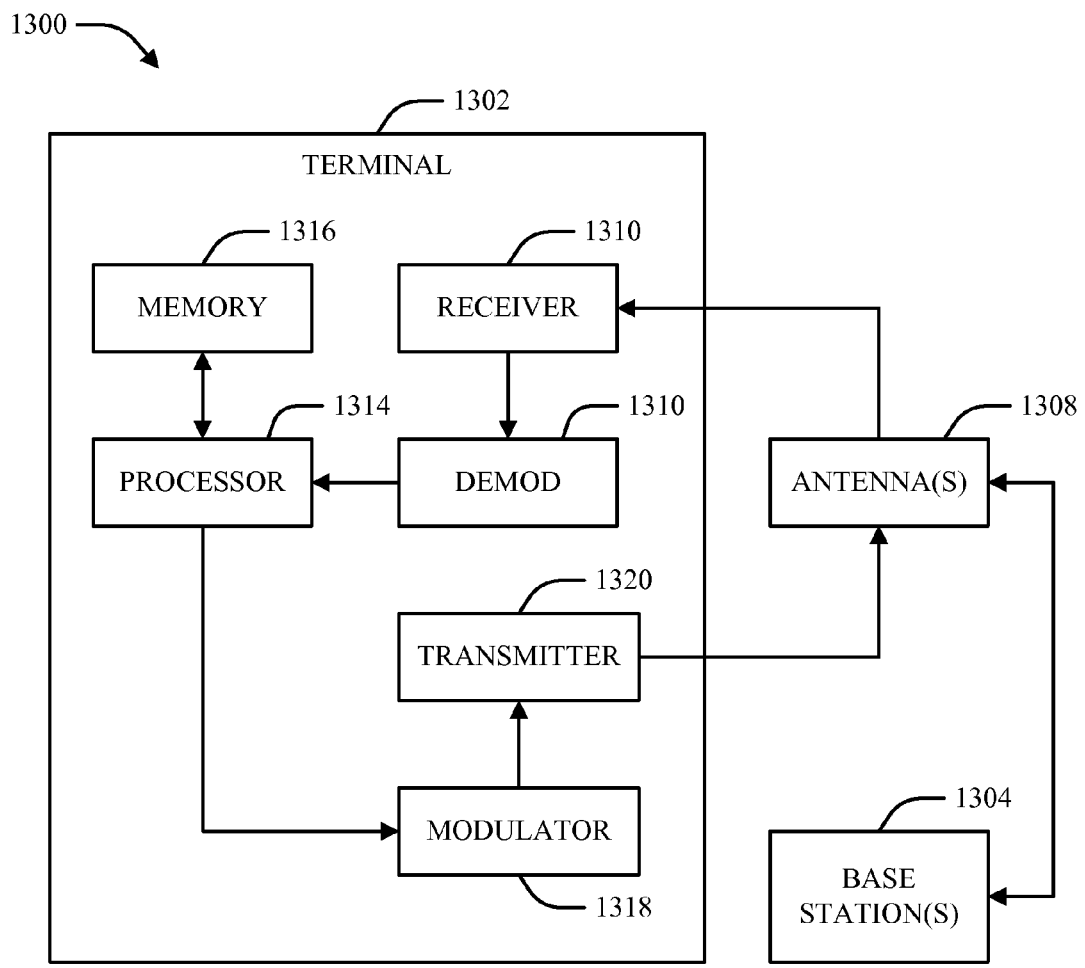

FIG. 13 is a block diagram of another system 1300 that can be utilized to implement various aspects of the functionality described herein. In one example, system 1300 includes a mobile terminal 1302. As illustrated, mobile terminal 1302 can receive signal(s) from one or more base stations 1304 and transmit to the one or more base stations 1304 via one or more antennas 1308. Additionally, mobile terminal 1302 can comprise a receiver 1310 that receives information from antenna(s) 1308. In one example, receiver 1310 can be operatively associated with a demodulator (Demod) 1312 that demodulates received information. Demodulated symbols can then be analyzed by a processor 1314. Processor 1314 can be coupled to memory 1316, which can store data and/or program codes related to mobile terminal 1302. Additionally, mobile terminal 1302 can employ processor 1314 to perform methodologies 800-900 and/or other similar and appropriate methodologies. Mobile terminal 1302 can also include a modulator 1318 that can multiplex a signal for transmission by a transmitter 1320 through antenna(s) 1308.

Figure 14:
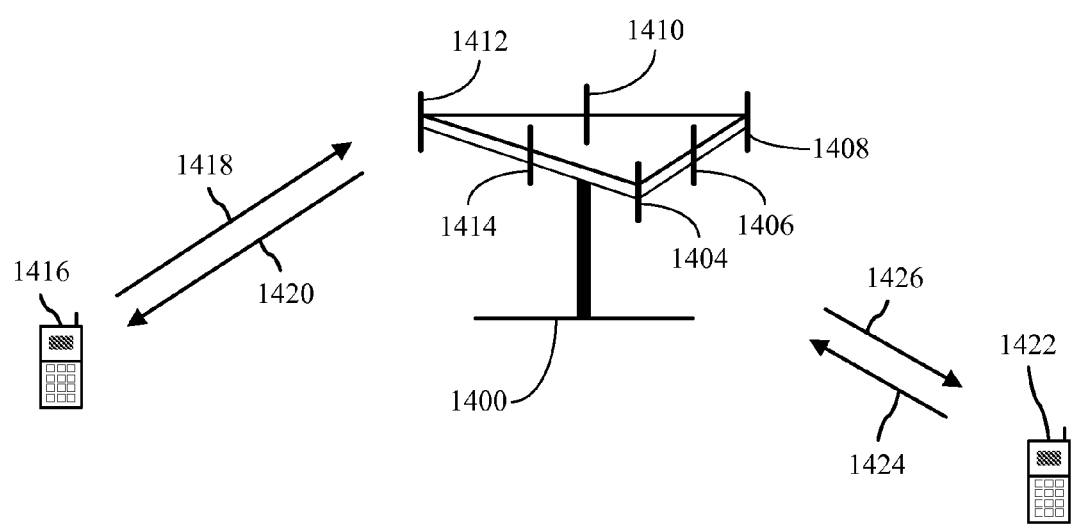
FIG. 14 illustrates a wireless multiple-access communication system in accordance with various aspects set forth herein.

Referring now to FIG. 14, an illustration of a wireless multiple-access communication system is provided in accordance with various aspects. In one example, an access point 1400 (AP) includes multiple antenna groups. As illustrated in FIG. 14, one antenna group can include antennas 1404 and 1406, another can include antennas 1408 and 1410, and another can include antennas 1412 and 1414. While only two antennas are shown in FIG. 14 for each antenna group, it should be appreciated that more or fewer antennas may be utilized for each antenna group. In another example, an access terminal 1416 can be in communication with antennas 1412 and 1414, where antennas 1412 and 1414 transmit information to access terminal 1416 over forward link 1420 and receive information from access terminal 1416 over reverse link 1418. Additionally and/or alternatively, access terminal 1422 can be in communication with antennas 1406 and 1408, where antennas 1406 and 1408 transmit information to access terminal 1422 over forward link 1426 and receive information from access terminal 1422 over reverse link 1424. In a frequency division duplex system, communication links 1418, 1420, 1424 and 1426 can use different frequency for communication. For example, forward link 1420 may use a different frequency then that used by reverse link 1418.

Each group of antennas and/or the area in which they are designed to communicate can be referred to as a sector of the access point. In accordance with one aspect, antenna groups can be designed to communicate to access terminals in a sector of areas covered by access point 1400. In communication over forward links 1420 and 1426, the transmitting antennas of access point 1400 can utilize beamforming in order to improve the signal-to-noise ratio of forward links for the different access terminals 1416 and 1422. Also, an access point using beamforming to transmit to access terminals scattered randomly through its coverage causes less interference to access terminals in neighboring cells than an access point transmitting through a single antenna to all its access terminals.

An access point, e.g., access point 1400, can be a fixed station used for communicating with terminals and can also be referred to as a base station, an eNB, an access network, and/or other suitable terminology. In addition, an access terminal, e.g., an access terminal 1416 or 1422, can also be referred to as a mobile terminal, user equipment, a wireless communication device, a terminal, a wireless terminal, and/or other appropriate terminology.

Figure 15:
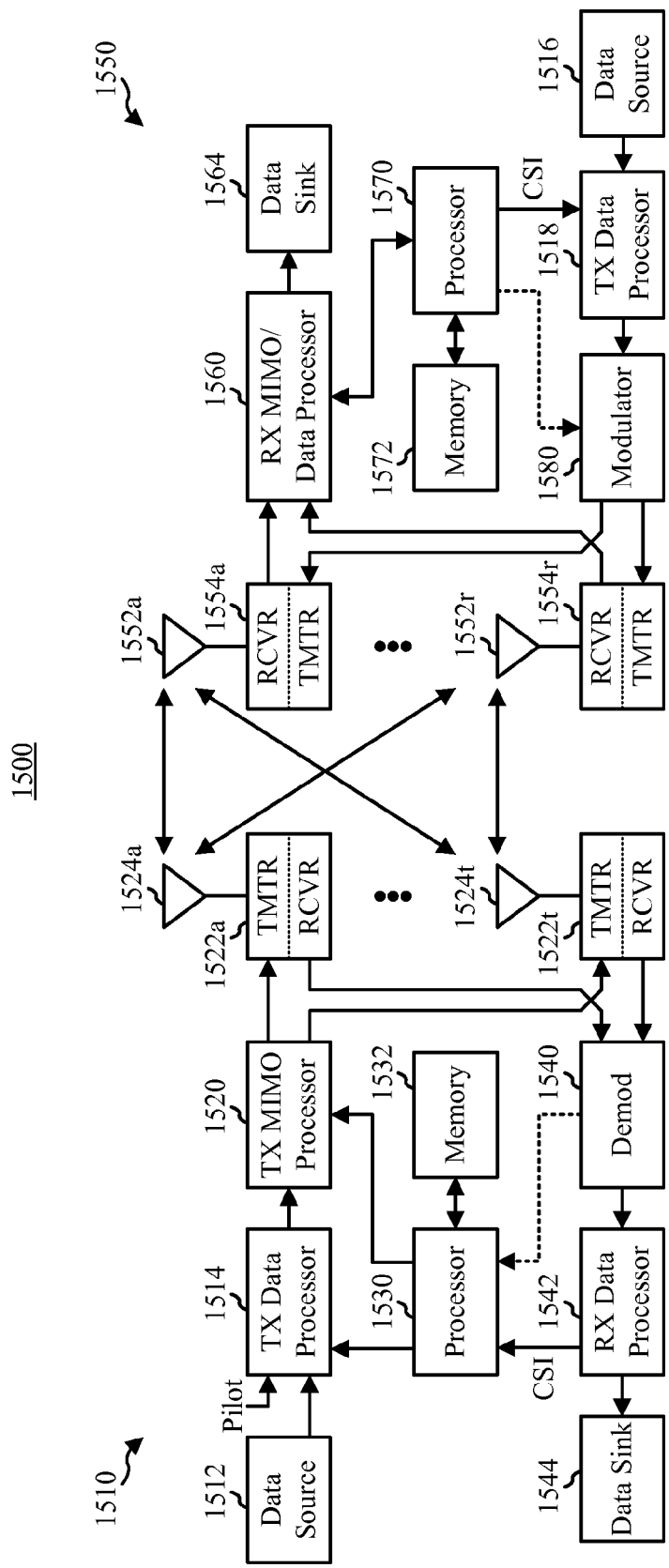
FIG. 15 is a block diagram illustrating an example wireless communication system in which various aspects described herein can function.

Referring now to FIG. 15, a block diagram illustrating an example wireless communication system 1500 in which various aspects described herein can function is provided. In one example, system 1500 is a multiple-input multiple-output (MIMO) system that includes a transmitter system 1510 and a receiver system 1550. It should be appreciated, however, that transmitter system 1510 and/or receiver system 1550 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1510 and/or receiver system 1550 described herein could be utilized in connection with a single output to single input antenna system.

In accordance with one aspect, traffic data for a number of data streams are provided at transmitter system 1510 from a data source 1512 to a transmit (TX) data processor 1514. In one example, each data stream can then be transmitted via a respective transmit antenna 1524. Additionally, TX data processor 1514 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1550 to estimate channel response. Back at transmitter system 1510, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1530.

Next, modulation symbols for all data streams can be provided to a TX processor 1520, which can further process the modulation symbols (e.g., for OFDM). TX MIMO processor 1520 can then provides $N_T$ modulation symbol streams to $N_T$ transceivers 1522a through 1522t. In one example, each transceiver 1522 can receive and process a respective symbol stream to provide one or more analog signals. Each transceiver 1522 can then further condition (e.g., amplify, filter, and upconvert) the analog signals to provide a modulated signal suitable for transmission over a MIMO channel. Accordingly, $N_T$ modulated signals from transceivers 1522a through 1522t can then be transmitted from $N_T$ antennas 1524a through 1524t, respectively.

In accordance with another aspect, the transmitted modulated signals can be received at receiver system 1550 by $N_R$ antennas 1552a through 1552r. The received signal from each antenna 1552 can then be provided to respective transceivers 1554. In one example, each transceiver 1554 can condition (e.g., filter, amplify, and downconvert) a respective received signal, digitize the conditioned signal to provide samples, and then processes the samples to provide a corresponding "received" symbol stream. An RX MIMO/data processor 1560 can then receive and process the $N_R$ received symbol streams from $N_R$ transceivers 1554 based on a particular receiver processing technique to provide $N_T$ "detected" symbol streams. In one example, each detected symbol stream can include symbols that are estimates of the modulation symbols transmitted for the corresponding data stream. RX processor 1560 can then process each symbol stream at least in part by demodulating, deinterleaving, and decoding each detected symbol stream to recover traffic data for a corresponding data stream. Thus, the processing by RX processor 1560 can be complementary to that performed by TX MIMO processor 1520 and TX data processor 1516 at transmitter system 1510. RX processor 1560 can additionally provide processed symbol streams to a data sink 1564.

In accordance with one aspect, the channel response estimate generated by RX processor 1560 can be used to perform space/time processing at the receiver, adjust power levels, change modulation rates or schemes, and/or other appropriate actions. Additionally, RX processor 1560 can further estimate channel characteristics such as, for example, signal-to-noise-and-interference ratios (SNRs) of the detected symbol streams. RX processor 1560 can then provide estimated channel characteristics to a processor 1570. In one example, RX processor 1560 and/or processor 1570 can further derive an estimate of the "operating" SNR for the system. Processor 1570 can then provide channel state information (CSI), which can comprise information regarding the communication link and/or the received data stream. This information can include, for example, the operating SNR. The CSI can then be processed by a TX data processor 1518, modulated by a modulator 1580, conditioned by transceivers 1554a through 1554r, and transmitted back to transmitter system 1510. In addition, a data source 1516 at receiver system 1550 can provide additional data to be processed by TX data processor 1518.

Back at transmitter system 1510, the modulated signals from receiver system 1550 can then be received by antennas 1524, conditioned by transceivers 1522, demodulated by a demodulator 1540, and processed by a RX data processor 1542 to recover the CSI reported by receiver system 1550. In one example, the reported CSI can then be provided to processor 1530 and used to determine data rates as well as coding and modulation schemes to be used for one or more data streams. The determined coding and modulation schemes can then be provided to transceivers 1522 for quantization and/or use in later transmissions to receiver system 1550. Additionally and/or alternatively, the reported CSI can be used by processor 1530 to generate various controls for TX data processor 1514 and TX MIMO processor 1520. In another example, CSI and/or other information processed by RX data processor 1542 can be provided to a data sink 1544.

In one example, processor 1530 at transmitter system 1510 and processor 1570 at receiver system 1550 direct operation at their respective systems. Additionally, memory 1532 at transmitter system 1510 and memory 1572 at receiver system 1550 can provide storage for program codes and data used by processors 1530 and 1570, respectively. Further, at receiver system 1550, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   identifying a diversion of communication associated with a handover and one or more Node B-ordered parameters of an associated Node B, wherein the one or more Node B-ordered parameters comprise at least one of a discontinuous transmission (DTX) configuration or a discontinuous reception (DRX) configuration;
   reestablishing communication subsequent to the diversion of communication upon detecting a triggering event associated with the handover; and
   synchronizing with respect to the one or more Node B-ordered parameters of the associated Node B upon re-establishment of communication according to at least one failure recovery resynchronization procedure, wherein the synchronizing comprises reverting associated DTX and DRX configurations to respective last DTX and DRX configurations utilized prior to initialization of the handover.

2. The method of claim 1, wherein the handover is a hard handover (HHO).

3. The method of claim 2, wherein the HHO comprises at least one of an inter-system HHO, an inter-radio access technology (RAT) HHO, or an inter-frequency HHO.

4. The method of claim 1, wherein the triggering event comprises at least one physical channel failure that enables use of the at least one failure recovery resynchronization procedure.

5. The method of claim 1, wherein the synchronizing comprises reverting associated DTX and DRX configurations to respective default configurations.

6. The method of claim 5, wherein the respective default configurations comprise a DTX disabled state and a DRX disabled state.

7. The method of claim 1, wherein the synchronizing further comprises identifying last DTX and DRX configurations according to respective DTX orders and DRX orders for which acknowledgements were transmitted prior to initiation of the handover.

8. The method of claim 1, wherein the synchronizing further comprises identifying last DTX and DRX configurations according to at least one of respective DTX orders received after a DTX activation window subsequent to initiation of the handover or respective DRX orders received after a DRX activation window subsequent to initiation of the handover.

9. The method of claim 1, wherein the synchronizing further comprises identifying last DTX and DRX configurations according to respective DTX orders and DRX orders received after at least one of a DTX activation window or a DRX activation window subsequent to initiation of the handover.

10. The method of claim 1, wherein the identifying, reestablishing, and synchronizing are performed by the associated Node B.

11. The method of claim 1, wherein:
the associated Node B is a serving Node B for a user equipment unit (UE); and
the identifying, reestablishing, and synchronizing are performed by the UE.

12. The method of claim 11, wherein:
the handover comprises a handover from the associated Node B to a target serving Node B for the UE; and
the reestablishing comprises reestablishing communication with the associated Node B upon identifying a failure associated with the handover to the target serving Node B.

13. A method, comprising:
identifying a diversion of communication associated with a handover and one or more Node B-ordered parameters of an associated Node B, wherein the one or more Node B-ordered parameters comprise at least one of a discontinuous transmission (DTX) configuration or a discontinuous reception (DRX) configuration;
reestablishing communication subsequent to the diversion of communication upon detecting a triggering event associated with the handover; and
synchronizing with respect to the one or more Node B-ordered parameters of the associated Node B upon reestablishment of communication according to at least one failure recovery resynchronization procedure, wherein the synchronizing comprises synchronizing with respect to at least one of a DTX configuration or a DRX configuration upon expiration of a predefined synchronization delay following the reestablishing.

14. A wireless communications apparatus, comprising:
a memory that stores data relating to a handover from a source Node B to a target Node B; and
a processor configured to synchronize with respect to one or more Node B-ordered configuration parameters of the source Node B upon detecting that the handover has encountered a failure, wherein the one or more Node B-ordered configuration parameters of the source Node B comprise at least one of a discontinuous transmission (DTX) configuration or a discontinuous reception (DRX) configuration and wherein the processor is further configured to set associated DTX and DRX configurations to respective last DTX and DRX configurations utilized prior to initialization of the handover upon detecting that the handover has encountered a failure.

15. The wireless communications apparatus of claim 14, wherein the failure comprises one or more of a failure to complete the handover or at least one physical channel failure that enables one or more procedures for synchronization with respect to the one or more Node B-ordered configuration parameters of the source Node B.

16. The wireless communications apparatus of claim 14, wherein the processor is further configured to set associated DTX and DRX configurations to respective default configurations upon detecting that the handover has encountered a failure.

17. The wireless communications apparatus of claim 16, wherein the respective default configurations include at least one of a DTX disabled state or a DRX disabled state.

18. The wireless communications apparatus of claim 14, wherein the processor is further configured to identify last DTX and DRX configurations according to respective DTX orders and DRX orders for which acknowledgements were transmitted prior to initiation of the handover.

19. The wireless communications apparatus of claim 14, wherein the processor is further configured to identify last DTX and DRX configurations according to at least one of respective DTX orders received after a DTX activation window subsequent to initiation of the handover or respective DRX orders received after a DRX activation window subsequent to initiation of the handover.

20. The wireless communications apparatus of claim 14, wherein the processor is further configured to identify last DTX and DRX configurations according to respective DTX orders and DRX orders received after at least one of a DTX activation window or a DRX activation window subsequent to initiation of the handover.

21. The wireless communications apparatus of claim 14, wherein the processor is further configured to synchronize with respect to at least one of a DTX configuration or a DRX configuration upon expiration of a predefined synchronization delay following detection of the failure.

22. The wireless communications apparatus of claim 14, wherein the memory and the processor are associated with the source Node B.

23. The wireless communications apparatus of claim 14, wherein the memory and the processor are associated with a user equipment unit (UE) served by the associated Node B.

24. An apparatus, comprising:
means for initializing a handover from a source cell to a target cell;
means for returning to coverage of the source cell upon detecting a triggering event associated with the handover; and
means for performing a synchronization with respect to one or more cell-controlled parameters of the source cell upon returning to the coverage of the source cell, wherein the one or more cell-controlled parameters of the source cell comprise at least one of a discontinuous transmission (DTX) status or a discontinuous reception (DRX) status and wherein the means for performing synchronization comprises means for setting an associated DTX status and an associated DRX status to respective last DTX and DRX states utilized prior to initialization of the handover.

25. The apparatus of claim 24, wherein the triggering event comprises one or more of a failure to complete the handover or one or more physical channel failures that enable synchronization with respect to one or more cell-controlled parameters of the source cell.

26. The apparatus of claim 24, wherein the means for performing synchronization comprises means for setting an associated DTX status and an associated DRX status to respective default states.

27. The apparatus of claim 26, wherein the respective default states comprise at least one of a DTX disabled state or a DRX disabled state.

28. The apparatus of claim 24, wherein the means for performing synchronization further comprises means for identifying the respective last DTX and DRX states according to respective DTX orders and DRX orders for which acknowledgements were transmitted prior to initiation of the handover.

29. The apparatus of claim 24, wherein the means for performing synchronization further comprises means for identifying the respective last DTX and DRX states according to at least one of respective DTX orders received after a time duration for DTX activation subsequent to initiation of the handover or respective DRX orders received after a time duration for DRX activation subsequent to initiation of the handover.

30. The apparatus of claim 24, wherein the means for performing synchronization further comprises means for identifying the respective last DTX and DRX states according to respective DTX orders and DRX orders received after a time duration for DTX activation or a time duration for DRX activation subsequent to initiation of the handover.

31. An apparatus, comprising,
means for initializing a handover from a source cell to a target cell;
means for returning to coverage of the source cell upon detecting a triggering event associated with the handover; and
means for performing synchronization with respect to one or more cell-controlled parameters of the source cell upon returning to the coverage of the source cell, wherein the one or more cell-controlled parameters of the source cell comprise at least one of a discontinuous transmission (DTX) status or a discontinuous reception (DRX) status and wherein the means for performing synchronization comprises means for performing synchronization with respect to at least one of a DTX status or a DRX status upon expiration of a predefined synchronization timer following the triggering event.

32. A non-transitory computer-readable medium, comprising:
code for causing a computer to initialize a handover from a source cell to a target cell;
code for causing a computer to return to coverage of the source cell upon detecting a triggering event associated with the handover; and
code for causing a computer to perform synchronization with respect to one or more cell-controlled parameters of the source cell upon returning to the coverage of the source cell, wherein the one or more cell-controlled parameters of the source cell comprise at least one of a discontinuous transmission (DTX) status or a discontinuous reception (DTX) status and wherein the code for causing a computer to perform synchronization comprises code for causing a computer to set an associated DTX status and an associated DRX status to respective last DTX and DRX states utilized prior to initialization of the handover.

33. The non-transitory computer-readable medium of claim 32, wherein the triggering event comprises one or more of a failure to complete the handover or one or more physical channel failures that enable synchronization with respect to one or more cell-controlled parameters of the source cell.

34. The of claim 32, wherein the code for causing a computer to perform synchronization comprises code for causing a computer to set an associated DTX status and an associated DRX status to respective default states.

35. The non-transitory computer-readable medium of claim 34, wherein the respective default states comprise at least one of a DTX disabled state or a DRX disabled state.

36. The non-transitory computer-readable medium of claim 32, wherein the code for causing a computer to perform synchronization further comprises code for causing a computer to identify the respective last DTX and DRX states according to respective DTX orders and DRX orders for which acknowledgements were transmitted prior to initiation of the handover.

37. The non-transitory computer-readable medium of claim 32, wherein the code for causing a computer to perform synchronization further comprises code for causing a computer to identify the respective last DTX and DRX states according to at least one of respective DTX orders received after a time duration for DTX activation subsequent to initiation of the handover or respective DRX orders received after a time duration for DRX activation subsequent to initiation of the handover.

38. The non-transitory computer-readable medium of claim 32, wherein the code for causing a computer to perform synchronization further comprises code for causing a computer to identify the respective last DTX and DRX states according to respective DTX orders and DRX orders received after a time duration for DTX activation or a time duration for DRX activation subsequent to initiation of the handover.

39. A non-transitory computer-readable medium, comprising:
code for causing a computer to initialize a handover from a source cell to a target cell;
code for causing a computer to return to coverage of the source cell upon detecting a triggering event associated with the handover; and
code for causing a computer to perform synchronization with respect to one or more cell-controlled parameters of the source cell upon returning to the coverage of the source cell, wherein the one or more cell-controlled parameters of the source cell comprise at least one of a discontinuous transmission (DTX) status or a discontinuous reception (DRX) status and wherein the code for causing a computer to perform synchronization comprises code for causing a computer to perform synchronization with respect to at least one of a DTX status or a DRX status upon expiration of a predefined synchronization timer following the triggering event.

40. A method, comprising:
receiving a message initializing a change of communication service from a source cell to a target cell;
returning to communication service of the source cell upon identifying a failure in the change of communication service; and
reverting to at least one of a discontinuous transmission (DTX) configuration or a discontinuous reception (DRX) configuration utilized prior to reception of the message initializing the change of communication at least in part by instructing a physical layer entity to consider only DTX/DRX orders which were acknowledged prior to an activation time of the message initializing the change of communication.

41. The method of claim 40, wherein:
the chance of communication service is associated with a handover; and
the failure in the change of communication service comprises a failure to complete the handover.

42. The method of claim 40, wherein the failure in the change of communication service comprises at least one physical channel failure.

43. The method of claim 40, wherein:
the change of communication service is associated with a cell change order; and
the failure in the change of communication service comprises a failure to complete the cell change order.

* * * * *